Figure 1:
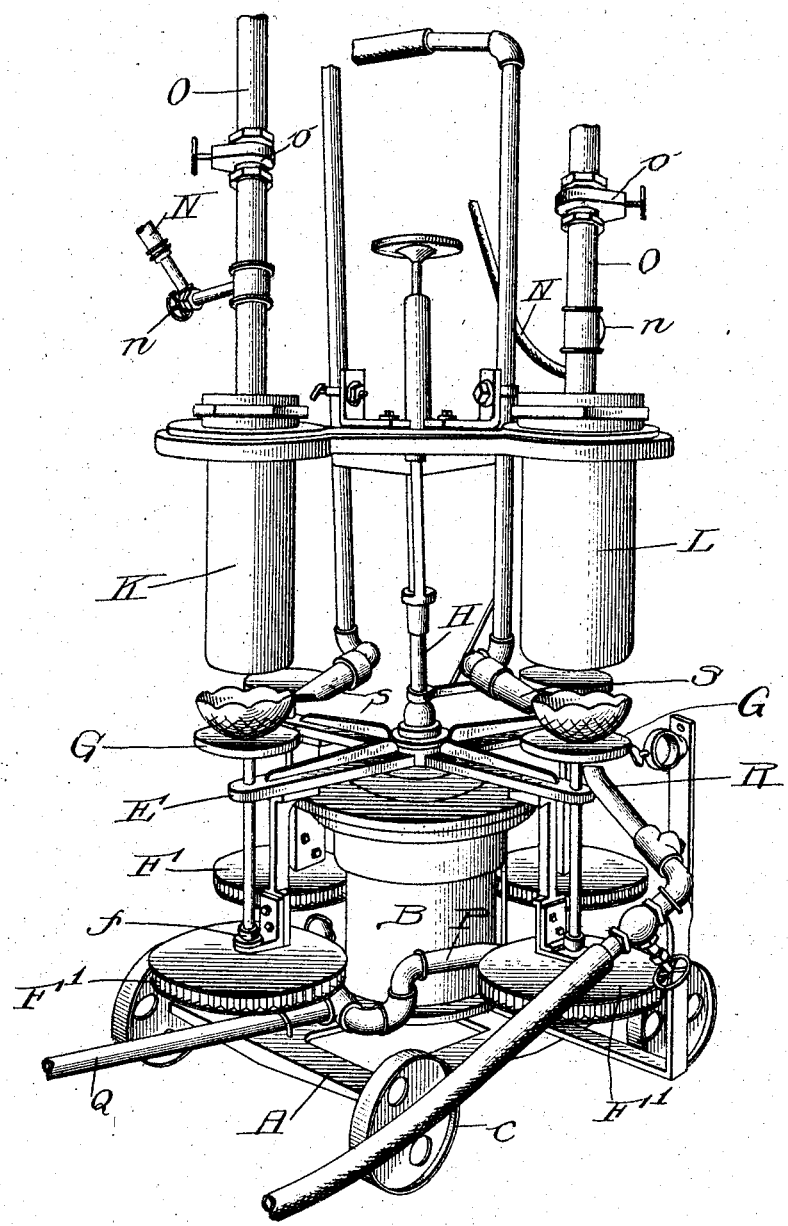

No. 772,901. PATENTED OCT. 18, 1904.
C. J. NOLAN.
APPARATUS FOR FIRE POLISHING GLASS.
APPLICATION FILED AUG. 6, 1904.

NO MODEL. 5 SHEETS—SHEET 1.

Witnesses:
J B Weir.

Inventor:
C. J. Nolan
By Raymond F Barnett
Attys

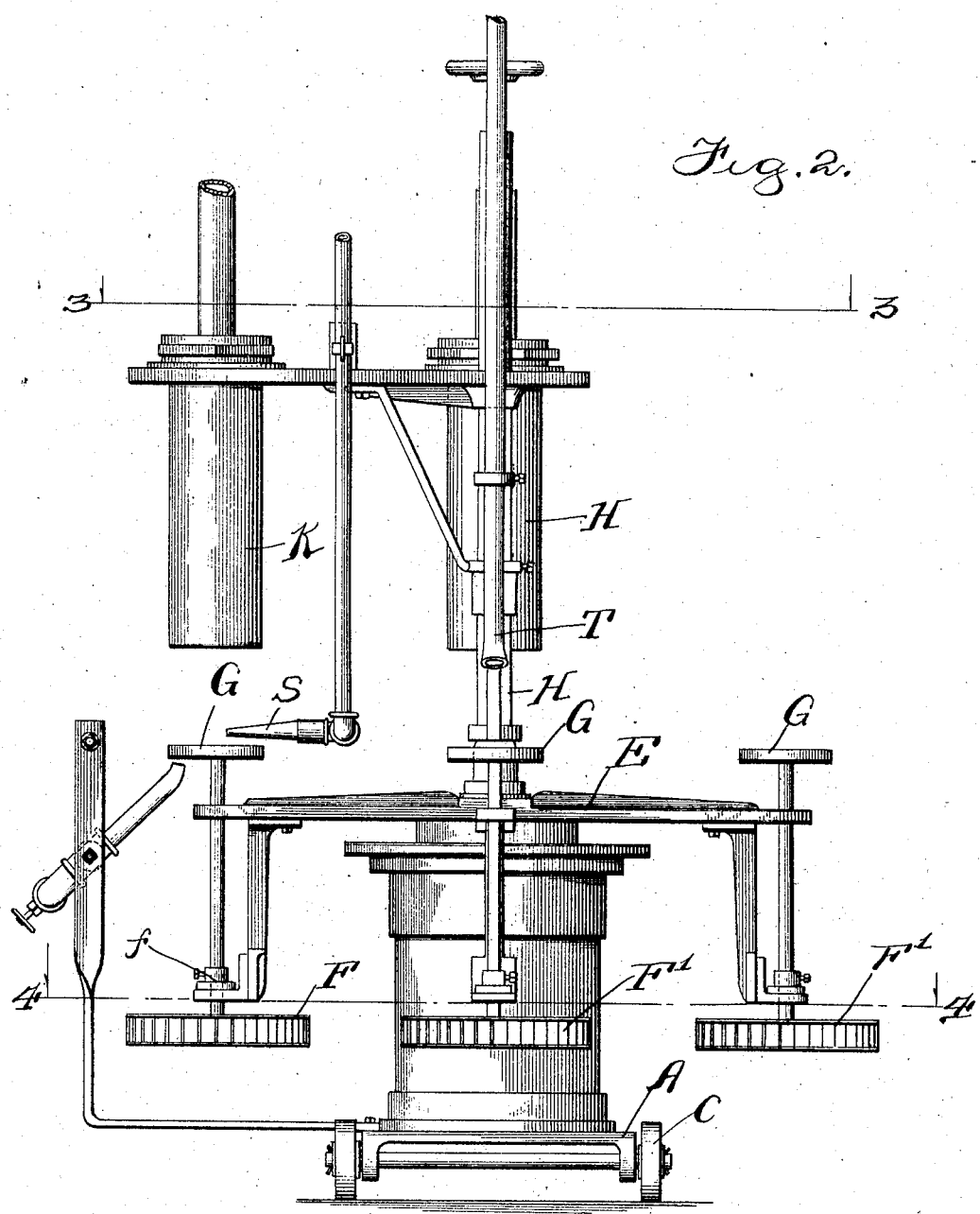

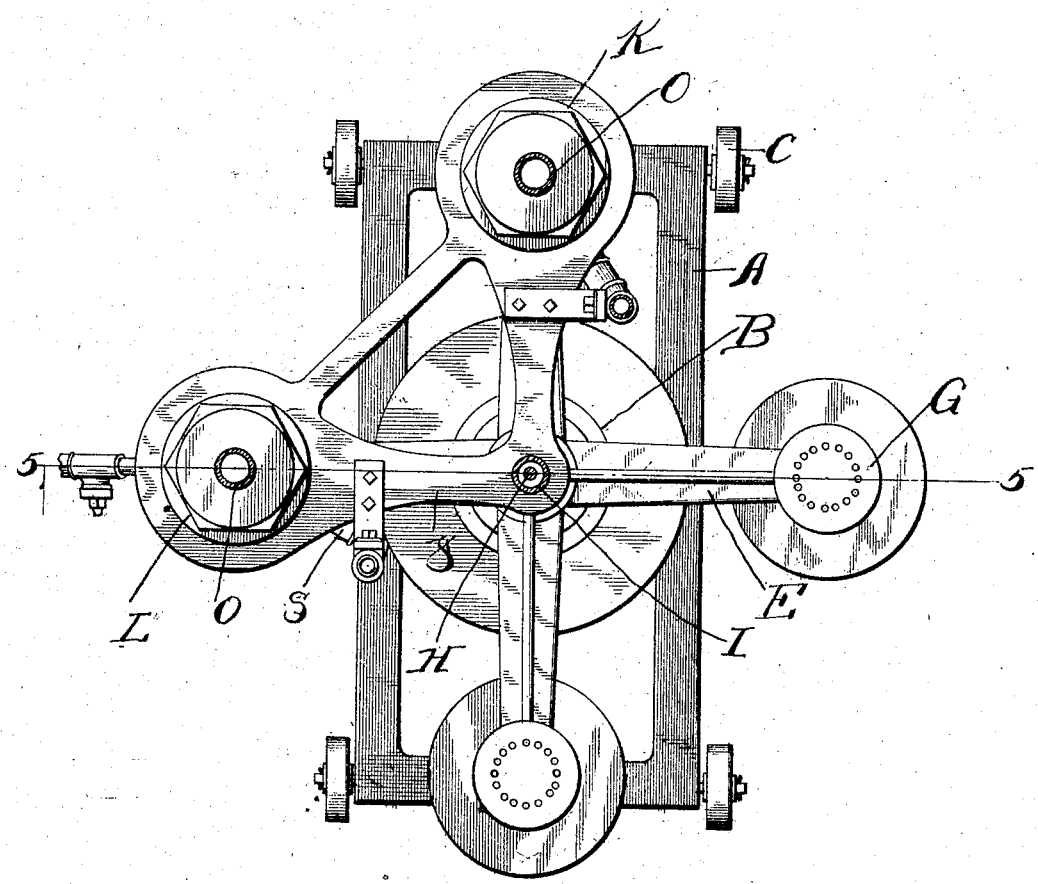

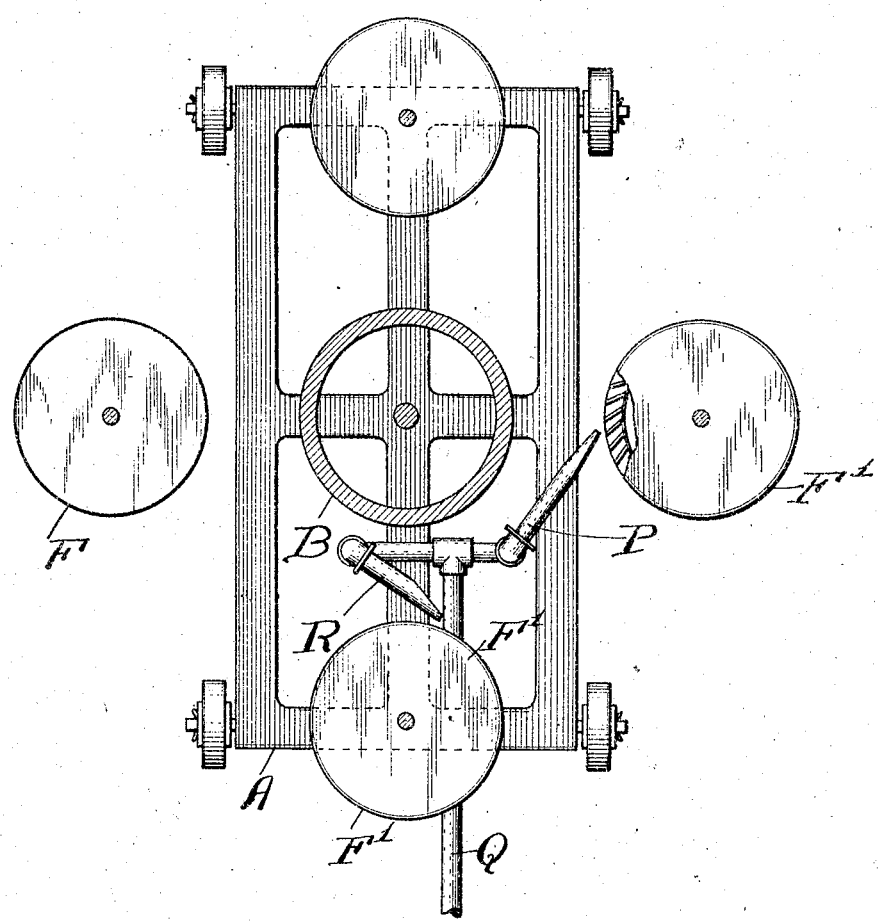

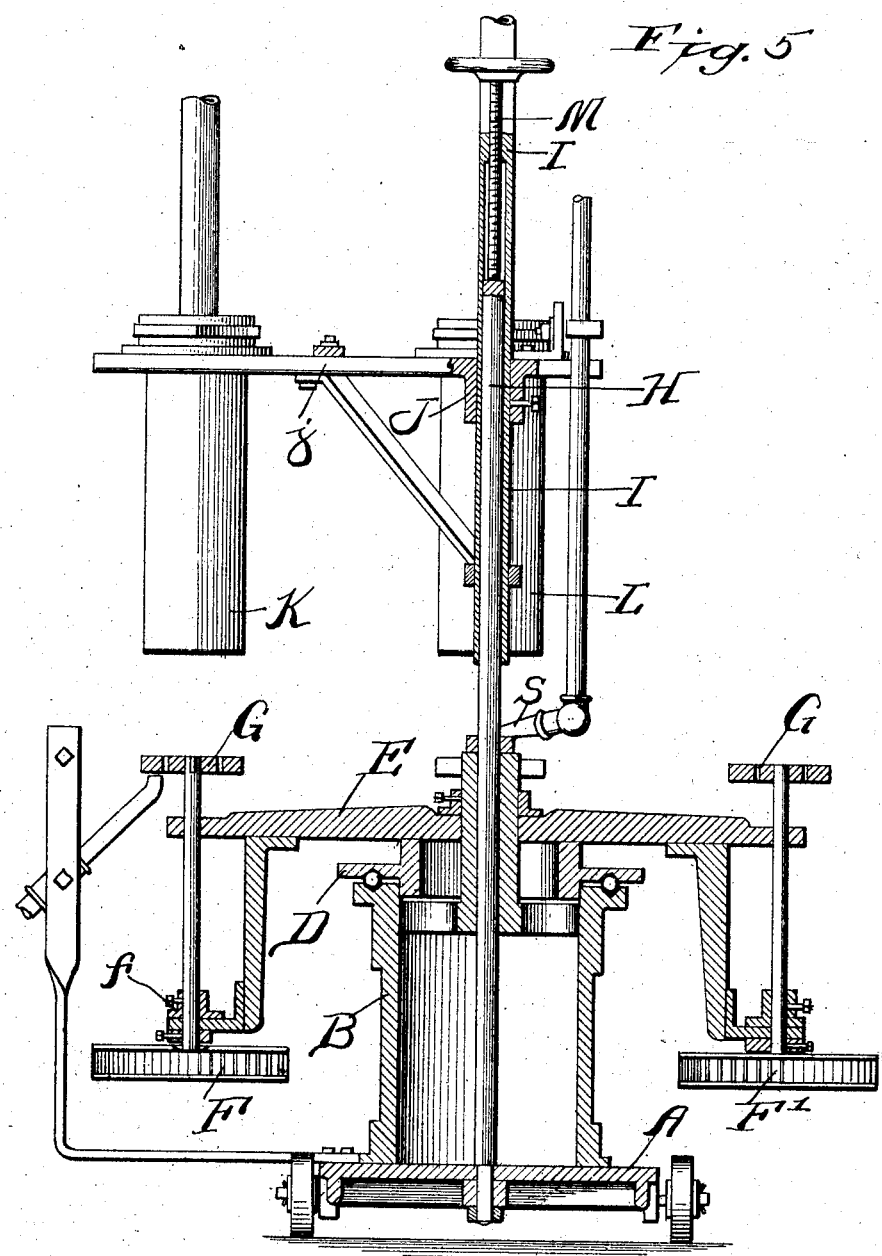

No. 772,901. Patented October 18, 1904.

UNITED STATES PATENT OFFICE.

CORNELIUS JAMES NOLAN, OF TOLEDO, OHIO, ASSIGNOR TO THE LIBBEY GLASS COMPANY, OF TOLEDO, OHIO, A CORPORATION OF OHIO.

APPARATUS FOR FIRE-POLISHING GLASS.

SPECIFICATION forming part of Letters Patent No. 772,901, dated October 18, 1904.

Application filed August 6, 1904. Serial No. 219,766. (No model.)

*To all whom it may concern:*

Be it known that I, CORNELIUS JAMES NOLAN, a citizen of the United States, residing at Toledo, in the county of Lucas and State of Ohio, have invented certain new and useful Improvements in Apparatus for Fire-Polishing Glass, of which the following is a specification.

My invention relates to improvements in apparatuses for fire-polishing glass and possesses some features in common with the apparatus shown in my Patent No. 766,193, dated August 2, 1904. Nevertheless my present invention possesses some features which are entirely independent thereof.

The object of my invention is to provide an improved apparatus for practicing the improvements in the art of fire-polishing glass which are disclosed and claimed in my copending application of even date herewith. These and such other objects as may hereinafter appear are attained by the preferred embodiment of my invention disclosed in the accompanying drawings, in which—

Figure 1 is a perspective view; Fig. 2, an end elevation; Fig. 3, a plan view on the line 3 3 of Figs. 2 and 5; Fig. 4, a sectional plan view on the line 4 4 of Figs. 2 and 5, and Fig. 5 a vertical sectional view on the line 5 5 of Figs. 3 and 4.

Like letters of reference indicate the same parts in the several figures of the drawings.

Referring by letter to the accompanying drawings, A is a support or platform which carries a pedestal B and is preferably mounted upon wheels C.

D is a rotatable support which rests upon the top of the pedestal B and is preferably carried by antifriction-bearings, as is shown, and in turn carries a plurality of spider-arms E. Journaled in the outer end of each spider-arm E is a vertical shaft F. Each spider-arm E is also provided with a downwardly-extending bracket $e$, within which the shaft F is also journaled, the shaft F being supported in position by a collar $f$ and being provided at its lower end with a suitable motor F' and at its upper end with a support or table G, which is preferably perforated for a purpose hereinafter specified.

H is a vertical shaft which is supported within the pedestal B and extends upwardly through the rotatable top B and carries a sleeve I, upon which is mounted a spider J, provided with arms $j$, which carry the carbonizing-burner K and polishing-burner L, respectively. The height of the burners K L may be adjusted by means of the screw-threaded shaft M, which screws into the upper end of the sleeve I and rests in the upper end of the shaft H. The burners K L are provided, respectively, with fuel-pipes N and air-pipes O, provided with valves $n$ and $o$, respectively, whereby the relative proportions of air and fuel may be adjusted and varied.

While any suitable means may be provided for rotating the supports G, I have shown for that purpose the air-wheels or motors F', which are rotated by jets of air supplied to the nozzle P through the compressed or fan air pipe Q, while the nozzles R, S, and T are likewise provided with compressed or fan air in any convenient manner.

In operation the article to be polished is placed upon the top of one of the tables G, whereupon the spider-arms are rotated until the table G, carrying the article to be polished, is brought beneath the burner K. This burner is supplied with a fuel mixture containing a mixture of gas or like fuel, whereby a comparatively low heat is generated and the surface of the article exposed to the flame of said burner is covered with a deposit or coating by the action of the flame projected from said burner against the article to be polished. Thereupon the spider carrying the arms E is again rotated until the now-coated article is brought beneath the burner L, which is supplied with a fuel mixture containing a larger proportion of air, whereby an intensely-hot blast of flame is produced, which flame consumes the coating deposited on the article by the burner K and in so doing fuses the surface being polished and produces a perfect polish thereon. As soon as the coating deposited on the article by the burner K has been burned off by the flame from the burner L the spider is again rotated, carrying the article beneath the nozzle T, through which a cooling-blast of air is projected. The article is then removed and carried to the leer. During the successive steps of this process the tables G are rotated by the jets of air projected against the wheels F' or in any other suitable manner, and the exterior of the article under treatment is kept cool by blasts of cold air projected against it through the nozzles S, and, at least while under the influence of the intense heat from the burner L, the article is also preferably subjected to a continuous blast through the nozzle R, which blast is projected through the perforations in the support G against the bottom of the article resting on said support.

While I have shown my invention embodied in what I now consider its preferred form, it should be understood that I do not limit myself to the specific embodiment thereof now shown.

It will be noted that the process herein disclosed is not herein claimed, but forms the subject-matter of an application filed of even date herewith, Serial No. 219,767.

I claim—

1. In a fire-polishing apparatus, the combination with a plurality of burners, of means for supporting the article to be polished, means for exposing it successively to heat projected from said burners, and means for keeping the exterior of the article sufficiently cool during said operation.

2. A fire-polishing apparatus, comprising a plurality of burners, a rotatable support, a plurality of rotatable tables carried by said support, and arranged to be brought successively under said burners, and means for cooling one surface of the article being treated.

3. In a fire-polishing apparatus, the combination with a plurality of burners, of means for supplying air and a fuel element to said burners, means for varying the proportions of air and of the fuel element fed to said burners, respectively, a pedestal, a movable support carried by said pedestal, a plurality of tables carried by said support and arranged to be brought successively and separately under said burners, and means for preventing the distortion of the articles carried by said tables when subjected to the heat projected from said burners.

4. In a fire-polishing apparatus, the combination with a plurality of burners, of means for supplying fuel elements in variable proportions to said burners, respectively, a movable support arranged to carry an article to be polished in front of said burners successively, and means for preserving the shape of such article when subjected to the action of heat projected from said burners.

5. In a fire-polishing apparatus, the combination with a plurality of burners provided, respectively, with means for supplying fuel elements thereto in variable proportions, of a movable support arranged to carry the article to be polished beneath said burners successively, and means for sufficiently cooling one surface of such article to preserve its shape while being subjected to the action of heat projected from said burners respectively.

6. A fire-polishing apparatus, comprising a plurality of burners provided, respectively, with means for supplying fuel elements thereto in variable proportions, a movable support arranged to carry an article to be polished in front of said burners successively, means for rotating the article to be polished while subjected to the action of heat projected from said burners, and means for cooling the exterior of said articles during such operation.

7. In a fire-polishing apparatus, the combination with a pair of burners provided, respectively, with means for supplying fuel elements thereto in variable proportions, of a pedestal, a rotatable spider, provided with a plurality of radiating arms carried by said pedestal, a rotatable support carried on the outer end of each of said arms and arranged to be brought successively under said burners by the rotation of said spider, means for rotating each of said supports, and means for projecting a cooling-current of air against the exterior of articles carried by said supports, respectively, when beneath said burners, respectively.

CORNELIUS JAMES NOLAN.

Witnesses:
F. E. WOLF,
C. C. OSWALD.